(12) United States Patent
Bhogal et al.

(10) Patent No.: US 8,307,041 B2
(45) Date of Patent: Nov. 6, 2012

(54) MULTI-APPLICATION FOLLOW-UP

(75) Inventors: Kulvir S. Bhogal, Pflugerville, TX (US);
Robert R. Peterson, Austin, TX (US);
Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/651,391

(22) Filed: Dec. 31, 2009

(65) Prior Publication Data
US 2011/0161438 A1   Jun. 30, 2011

(51) Int. Cl.
*G06F 15/16*   (2006.01)
*G06F 3/00*    (2006.01)
(52) U.S. Cl. .......................... 709/206; 709/204; 715/752
(58) Field of Classification Search ................. 709/204, 709/206, 207; 715/752, 753
See application file for complete search history.

(56) References Cited

U.S. PATENT DOCUMENTS

| 7,433,920 | B2* | 10/2008 | Blagsvedt et al. ............ 709/204 |
| 7,979,501 | B1* | 7/2011 | Coleman et al. ............. 709/207 |
| 2007/0038711 | A1* | 2/2007 | MacBeth et al. ............. 709/206 |
| 2009/0119606 | A1* | 5/2009 | Gilbert ........................ 715/758 |

* cited by examiner

*Primary Examiner* — Brian J Gillis
(74) *Attorney, Agent, or Firm* — David A. Dagg

(57) ABSTRACT

A system that responds to a user setting a follow-up flag on a message within a first communication application by associating the flagged message with another user, such that the flagged message is available to a second communication application. When a user sets a flag on an electronic mail message contained in an electronic mail mailbox provided by an electronic mail application, the system responds by associating the flagged message with another user in a list of other users with whom flagged messages are associated. When a communication session occurs with the other user through another communication application, the system checks the list and determines that a flagged message is associated with the other user. The flagged message is then brought to the attention of the local user, for example within a list of flagged messages associated with the other user displayed simultaneously with the instant messaging session.

11 Claims, 4 Drawing Sheets

MULTI-APPLICATION FOLLOW-UP

FIELD OF THE INVENTION

The present invention relates generally to communication application systems, and more specifically to a method and system for providing a multi-application follow-up mechanism.

BACKGROUND OF THE INVENTION

Users of communication applications often desire to store indications that a follow up is required for one or more messages stored by an application. For example, electronic mail software applications must often deal with large numbers of electronic mail messages contained within the mail box structures provided by such applications. In order to assist users in this effort, existing electronic mail software applications allow the user to set follow up flags on specific messages, and/or to set up message rules that cause certain types of messages to automatically be flagged. When a flag is set, a visual icon is placed next to the flagged message, for example within a list of messages contained in a mailbox display object. These flags provide a visual indication of which messages in the mailbox need to be followed up on, and are sometimes referred to as "follow-up flags". Through this mechanism, a user looking at their previously received messages can conveniently distinguish those messages that need to be followed up on by way of the visual flag icons displayed next to those messages. When the user follows up on a flagged message, for example by replying to the flagged message with a reply electronic mail message, existing systems allow the user to remove the flag from the message representation within the message list of the electronic mail mailbox, for example by clicking on the flag, or by simply deleting the flagged message itself if it is no longer needed.

A problem with follow up flags arises in environments where multiple communication applications are used. In existing systems, a user may flag an electronic mail message for follow-up regarding a certain topic or question contained in the message. The user may subsequently be involved in a communication session through a different communication application, such as an instant messaging session, and during that session the topic or question within the flagged electronic mail message may be addressed or resolved. However, the flag on the electronic message would not be removed, and the next time the user viewed their electronic mail messages they would mistakenly be led to believe that a follow-up was still required on the message because of the follow-up flag. This would be the case even though the follow-up had actually been accomplished, albeit through a different communication application, and therefore independently with regard to the flagged message.

In Google's Gmail™, users are allowed to "follow up by chat" with another user that has sent them an electronic mail message and that is also listed within the receiving user's buddy list. To accomplish this, Gmail provides a hot link through which an instant messaging session can be initiated with the sending user to follow up on the subject of an electronic mail message. While this type of existing solution facilitates initiating an instant messaging session regarding a received electronic mail message, it fails to tie together the instant messaging system with any follow up flag that may have been set on the received electronic mail message.

Other existing systems have provided an automatic follow-up function within electronic mail. In these systems, a user can set up a reminder to follow up on a specific previously received message. These systems also fail to tie an instant messaging system to a follow up flag that was set on a received electronic mail message For the above reasons and others, it would accordingly be desirable to have a new system that effectively ties a follow up flag set within a first communication application, such as a flag set on an electronic mail message contained in a user's mailbox, to a second communication application, such as an instant messaging system.

SUMMARY OF THE INVENTION

To address the above described and other shortcomings of previous systems, a solution is disclosed that responds to a user setting a follow-up flag on a message within a first communication application by associating the flagged message with another user, such that the flagged message is available to a second communication application. In one embodiment, when a user sets a flag on an electronic mail message contained in an electronic mail mailbox provided by an electronic mail application, the disclosed system responds by associating the flagged message with another user (e.g. the user that sent the message) in a list of other users with whom flagged messages are associated. When a communication session occurs with the other user through another communication application, such as an instant messaging session, the disclosed system checks the list and determines that a flagged message is associated with the other user. The flagged message is then brought to the attention of the local user, for example within a list of flagged messages associated with the other user that is displayed simultaneously with the instant messaging session. When the instant messaging session terminates, the disclosed system queries the local user as to whether they wish to remove any of the follow-up flags from flagged messages associated with the other user or any other session participants. Indications that flagged-messages exist for another user may also be visually displayed in visual proximity to the icon or buddy list entry for that other user within the local user's buddy list.

In another embodiment, if a flagged-message is associated with at least one user who is a member of a user group, such as a group defined within the local user's buddy list, and a communication session is detected with any member of the group, the flagged message may be listed or displayed to the local user, and the local user may also be queried as to whether the follow up flag should be removed from the message when the session terminates. Additionally, when a user flags a message received from a member of a user group, the disclosed system may operate to associate the flagged message with entries for each group member, thereby causing indications of the flagged message to be displayed in visual proximity to the buddy list entry for each group member until the flag is removed.

Thus there is disclosed an automated solution that effectively ties a follow up flag set within a first communication application, such as a flag set on an electronic mail message contained in a user's mailbox, to a second communication application, such as an instant messaging system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
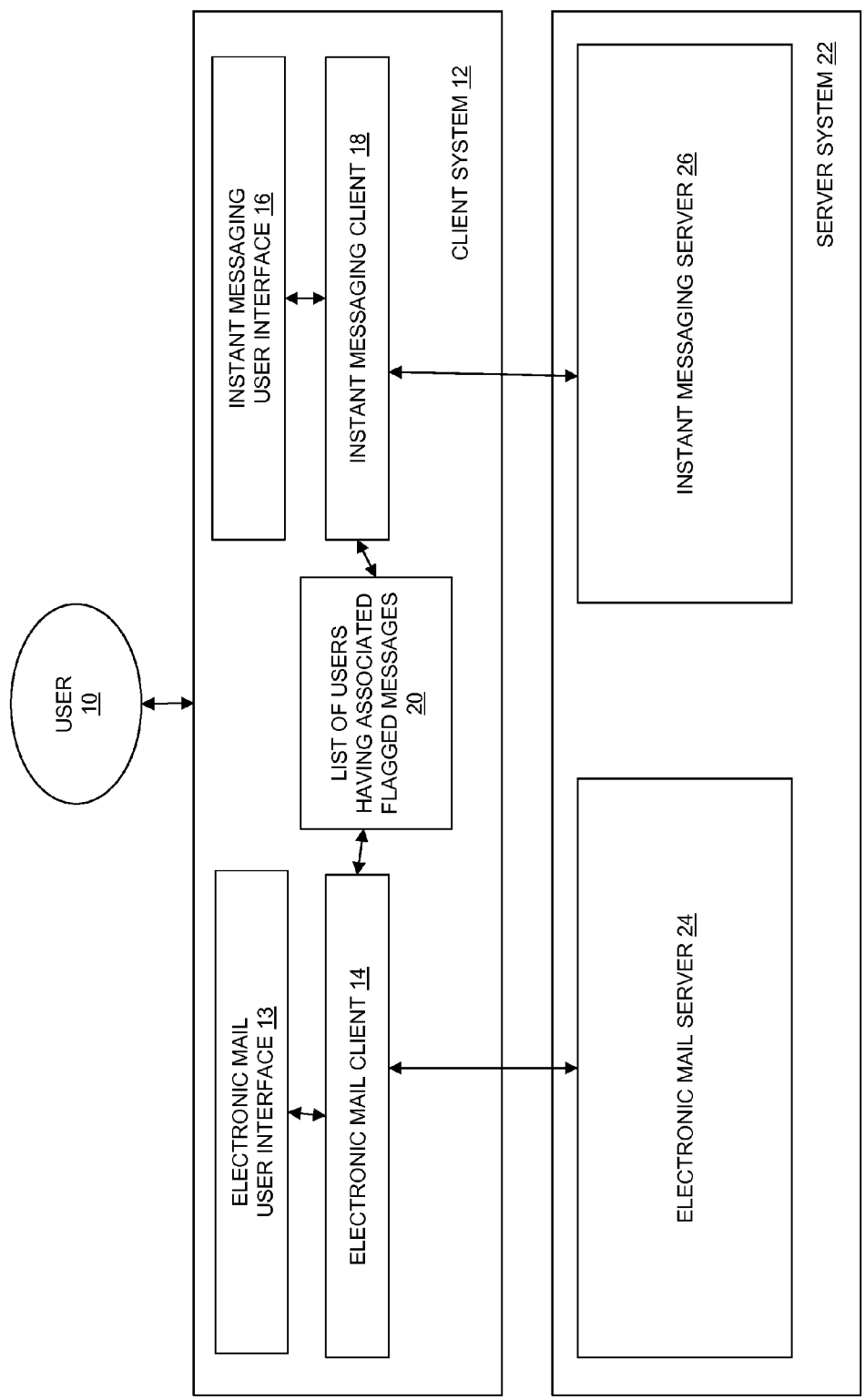
FIG. 1 is a block diagram showing components in an illustrative embodiment of the disclosed system.

FIG. 1 is a block diagram showing hardware and software components in an illustrative embodiment of the disclosed system. As shown in FIG. 1, User 10 is associated with a Client System 12, which may include an Electronic Mail Client 14 that generates an Electronic Mail User Interface 13, and an Instant Messaging Client 18 that generates an Instant Messaging User Interface 16. The Client System 12 also includes a List of Users Having Associated Flagged Messages 20. The Electronic Mail Client 14 operates together with a Electronic Mail Server 24 on a Server System 22 to provide an electronic mail service to User 10, and Instant Messaging Client 18 operates together with Instant Messaging Server 26 to provide an instant messaging service to User 10.

During operation of the components shown in the illustrative embodiment of FIG. 1, the Electronic Mail Client 14 responds to User 10 setting a follow-up flag on an Patent Application electronic message displayed in a mailbox of electronic mail messages (e.g. User 10's Inbox) by associating the flagged message with another user. For example, the Electronic Mail Client 14 may operate to automatically associate a received message flagged by User 10 with the sending user of the message (i.e. the user identified in the FROM: field of the message). The Electronic Mail Client 14 may associate the flagged message with the sending user by providing a list entry for the sending user in the List of Users Having Associated Flagged Messages 20, and by including an indication of the flagged message (e.g. a pointer or other message identifier) within the list entry. If no entry already exists for the sending user of the message in the List of Users Having Associated Flagged Messages 20, then the Electronic Mail Client 14 creates one for that user. Otherwise, if at least one other flagged message was previously associated with the sending user of the message, then the Electronic Mail Client 14 adds an indication of the newly flagged message to a list of flagged messages associated with the sending user contained in the list entry for the sending user in the List of Users Having Associated Flagged Messages 20.

While the above operational example describes associating a flagged electronic mail message with the sender of the message, the disclosed system is not so limited. The disclosed system may, for example, be alternatively embodied to provide the User 10 with the ability to enter or otherwise select a specific other user that the flagged message should be associated with through the List of Users Having Associated Flagged Messages 20.

As shown in FIG. 1, the List of Users Having Associated Flagged Messages 20 is also accessible to the Instant Messaging Client 18. The disclosed system subsequently operates to detect when User 10 is involved in an instant messaging session provided by the Instant Messaging Client 18 through Instant Messaging User Interface 16. When the instant messaging session is detected, the disclosed system (e.g. the Instant Messaging Client 18) checks the List of Users Having Associated Flagged Messages 20 to see if it contains an entry for any of the other users that are participating with User 10 in the instant messaging session. If so, then the disclosed system (e.g. the Instant Messaging Client 18) operates to provide a visual indication to User 10 in Instant Messaging User Interface 16 of those flagged messages associated through the List of Users Having Associated Flagged Messages 20 with other participants in the instant messaging session. For example, a portion or all of a flagged electronic mail message or messages associated with other instant messaging participants may be displayed in a background user interface window or windows positioned behind the user interface window containing the instant messaging session provided in Instant Messaging User Interface 16. Alternatively, a list showing the subjects of the flagged electronic mail messages associated with other instant messaging participants may be displayed within or adjacent to the user interface window containing the instant messaging session in Instant Messaging User Interface 16. For example, the subject of each such flagged electronic mail message may be provided as a link in list user interface object, such that each message link may be clicked on by the User 10 to access the complete corresponding flagged electronic mail message.

When the instant messaging session provided in Instant Messaging User Interface 16 terminates, the disclosed system (e.g. Instant Messaging Client 18) queries User 10 as to whether they wish to remove any of the follow-up flags from the flagged messages associated with the other participants in the instant messaging session. Such a query may, for example, be provided through a display object generated within the Instant Messaging User Interface 16.

The disclosed system (e.g. Instant Messaging Client 18) further operates to display indications that flagged electronic mail messages exist for buddies of the local user in visual proximity to the icons or buddy list entries for those other users within User 10's buddy list, for example within the Instant Messaging User Interface 16.

In another embodiment, the components of FIG. 1 may further operate in response to User 10 setting a follow up flag on an electronic mail message displayed in Electronic Mail User Interface 13 by determining whether the sending user of the message (or other specific user to be associated with the flagged message) is associated with a user group defined within the instant messaging application, e.g. defined within User 10's buddy list. If so, then the disclosed system may operate to associate the flagged message with each member of the user group in the List of Users Having Associated Flagged Messages 20.

While the List of Users Having Associated Flagged Messages 20 is shown in the illustrative embodiment of FIG. 1 as being contained in the Client System 12, those skilled in the art will recognize that the List of Users Having Associated Flagged Messages 20 may alternatively be stored on a server system, such as the Server System 22. Similarly, those skilled in the art will recognize that while the embodiment of FIG. 1 uses a client-server implementation, the disclosed system may alternatively be embodied using a peer-to-peer architecture, in which no server system is required. In such an alternative embodiment, the electronic mail system and instant messaging system are provided through client systems, and operations otherwise performed by the Server System 32 are performed in such client systems.

While for purposes of concise illustration only one user and client system are shown in FIG. 1, those skilled in the art will recognize that the disclosed system may be embodied such that any specific number of users may use the disclosed system. Similarly, while for purposes of concise illustration only one server system is shown in FIG. 1, the disclosed system may be embodied such that any specific number of server systems are used to perform the operations described in association with the Server System 32.

The Client System 12 of FIG. 1 may include any specific type of a computer system and/or intelligent electronic device, such as a desktop, laptop, or palmtop computer system, or a personal digital assistant, cell phone, and/or other electronic device. Client System 12 may include or control a display device that is capable of displaying a graphical user interface including Electronic Mail User Interface 13 and Instant Messaging User Interface 16 to User 10, such as a liquid crystal display (LCD), cathode ray tube (CRT), interferometric modulator display (IMOD), light emitting diode (LED), or the like.

Those skilled in the art will recognize that the Electronic Mail Client 14 and Instant Messaging Client 18 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client System 12 may include one or more processors, and program storage, such as memory, for storing program code executable on such processors (e.g. Electronic Mail Client 14 and Instant Messaging Client 18, and/or other application and/or operating system program code), as well as other input/output devices and/or other external interfaces.

Server System 32 may also be embodied as any specific type of computer system including one or more processors, and program storage, such as memory, for storing program code executable on such processors (e.g. Electronic Mail Server 24 and Instant Messaging Server 26, and/or other application and/or operating system program code), as well as for storing data and/or databases or the like. Server System 32 may further include a number of input/output devices and/or other external interfaces. Those skilled in the art will further recognize that Electronic Mail Server 24 and Instant Messaging Server 26 may also be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

The Client System 12 and Server System 32 may be communicably connected using any specific kind of data communication network and/or protocol.

Figure 2:
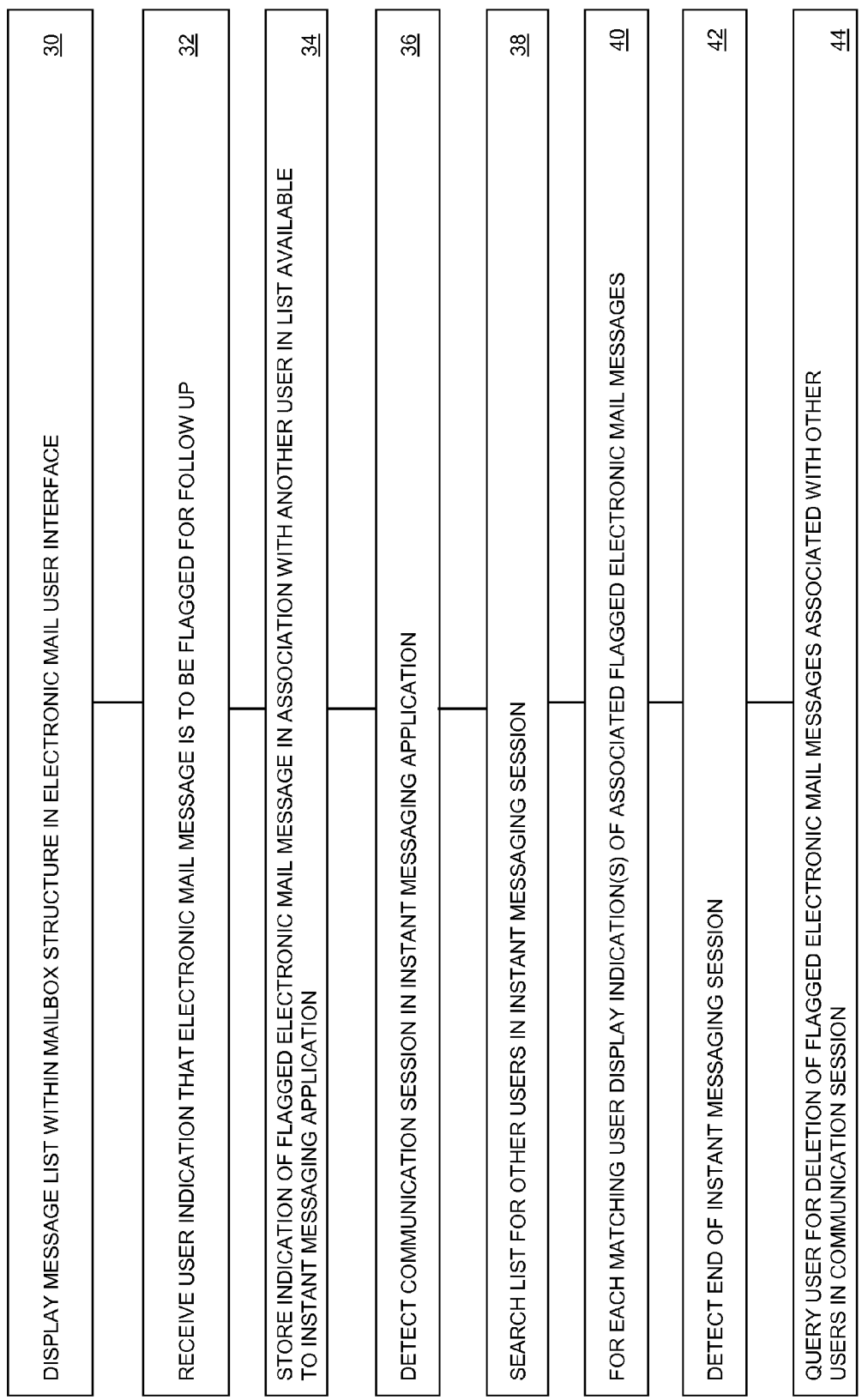
FIG. 2 is a first flow chart showing steps performed during operation of an illustrative embodiment of the disclosed system.

FIG. 2 is a flow chart showing steps performed during operation of an illustrative embodiment of the disclosed system. At step 30, the disclosed system displays a list of electronic mail messages, for example within a virtual mailbox structure (e.g. an "Inbox") displayed in an electronic mail user interface. At step 32, the disclosed system receives an indication that a local user viewing electronic mail user interface has set a follow up flag on one of the messages contained in the message list. At step 34, an indication is stored of the flagged electronic mail message in association with another user in a list of users with which flagged electronic mail messages are associated. The list of users with which flagged electronic mail messages are associated is accessible to an instant messaging application.

At step 36, the disclosed system detects a communication session being provided to the local user through an instant messaging user interface provided by an instant messaging application. The disclosed system then determines at step 38 whether any of the other participants in the instant messaging session are associated with flagged electronic mail messages, for example by determining whether any other participants have entries in the list of users associated with flagged electronic mail messages.

For each of the other instant messaging session participants that are associated with at least one flagged electronic mail message, at step 40 the disclosed system displays an indication of each associated flagged electronic mail message. In this way, the local user is made aware of all the flagged electronic mail messages associated with the participants of the instant messaging session while the instant messaging session is underway, thus allowing the local user to potentially follow up on those flagged electronic mail messages through the instant messaging session.

At step 42, the disclosed system detects the end of the instant messaging session. In response to detecting the end of the instant messaging session, at step 44 the disclosed system queries the local user as to whether any of the follow up flags should be removed from the flagged electronic mail messages associated with the other session participants (i.e. removed from the flagged electronic indicated at step 40). The user is then enabled to remove any such follow up flags, as may be appropriate depending on whether the user followed up on any of the flagged messages during the instant messaging session that is being terminated.

Figure 3:
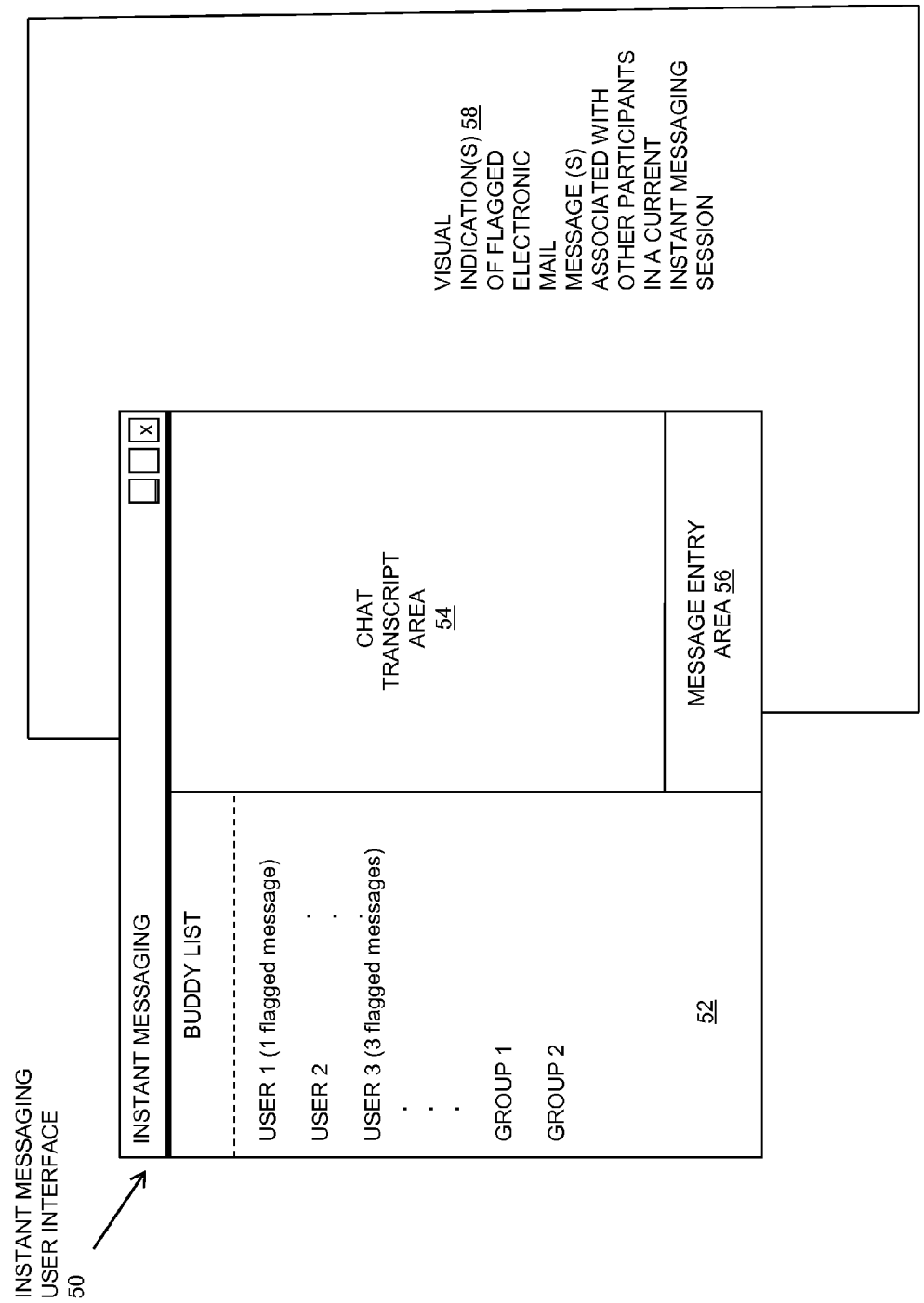
FIG. 3 is a first simplified screen shot showing examples of user interface display objects generated by an illustrative embodiment of the disclosed system.

FIG. 3 is a simplified screen shot showing an Instant Messaging User Interface 50 as generated by an illustrative embodiment of the disclosed system. As shown in FIG. 3, the Instant Messaging User Interface 50 includes a Buddy List 52, a Chat Transcript Area 54, and a Message Entry Area 56. The Chat Transcript Area 54 is used to display instant messages exchanged within a current instant messaging session between a local user and one or more other session participants. In order to enter a message into the current session, the local user enters the message into the Message Entry Area 56.

The Buddy List 2 includes an entry for each of the local user's buddies (User 1, User 2, User 3, etc.), as well as for one or more user groups (Group 1, Group 2, etc.). If a flagged electronic mail message exists for a buddy, the entry for that buddy includes a visual indication of the flagged message, or the total number of flagged messages for that buddy. For example, as shown in FIG. 3, there is one flagged electronic mail message associated with the buddy User 1. Accordingly, the text "1 flagged message" included within parenthesis next to "User 1" provides a visual indication to the local use that one flagged electronic mail message is currently associated with User 1. Similarly, the text "3 flagged messages" displayed in parenthesis adjacent to "User 3" indicates to the local user provides a visual indication that three flagged electronic mail messages are currently associated with User 3.

While for purposes of illustration in FIG. 3 text within parenthesis is used to indicate a number of electronic mail messages associated with each user in the Buddy List 52, the disclosed system is not so limited. Accordingly, those skilled in the art will recognize that any distinct visual indication may be used in the alternative to provide the visual indication to the local user of whether any flagged electronic mail messages are associated with a given buddy.

As further shown in FIG. 3, the disclosed system may be embodied to provide a Visual Indications 58 of flagged electronic mail messages associated with other participants in a current instant messaging session. For example, the Visual Indications 58 may include a list of flagged messages associated with other participants in the current instant messaging session, where each list entry includes a subject of the corresponding flagged message, and can be clicked on to access the complete message. Alternatively, the Visual Indication(s) 58 may be made up of one or more background windows displaying all or part of each of the flagged messages associated with the other participants in the current instant messaging session. Where more than one such flagged message exists, the windows displaying the messages to the local user may be stacked or cascaded behind the Instant Messaging User Interface 50. Those skilled in the art will recognize that the above described techniques for displaying the flagged electronic mail messages associated with other participants in the current instant messaging session to the local user are only two possibilities, and that alternative embodiments may use other specific types and/or arrangements of user interface display objects for this purpose.

Figure 4:
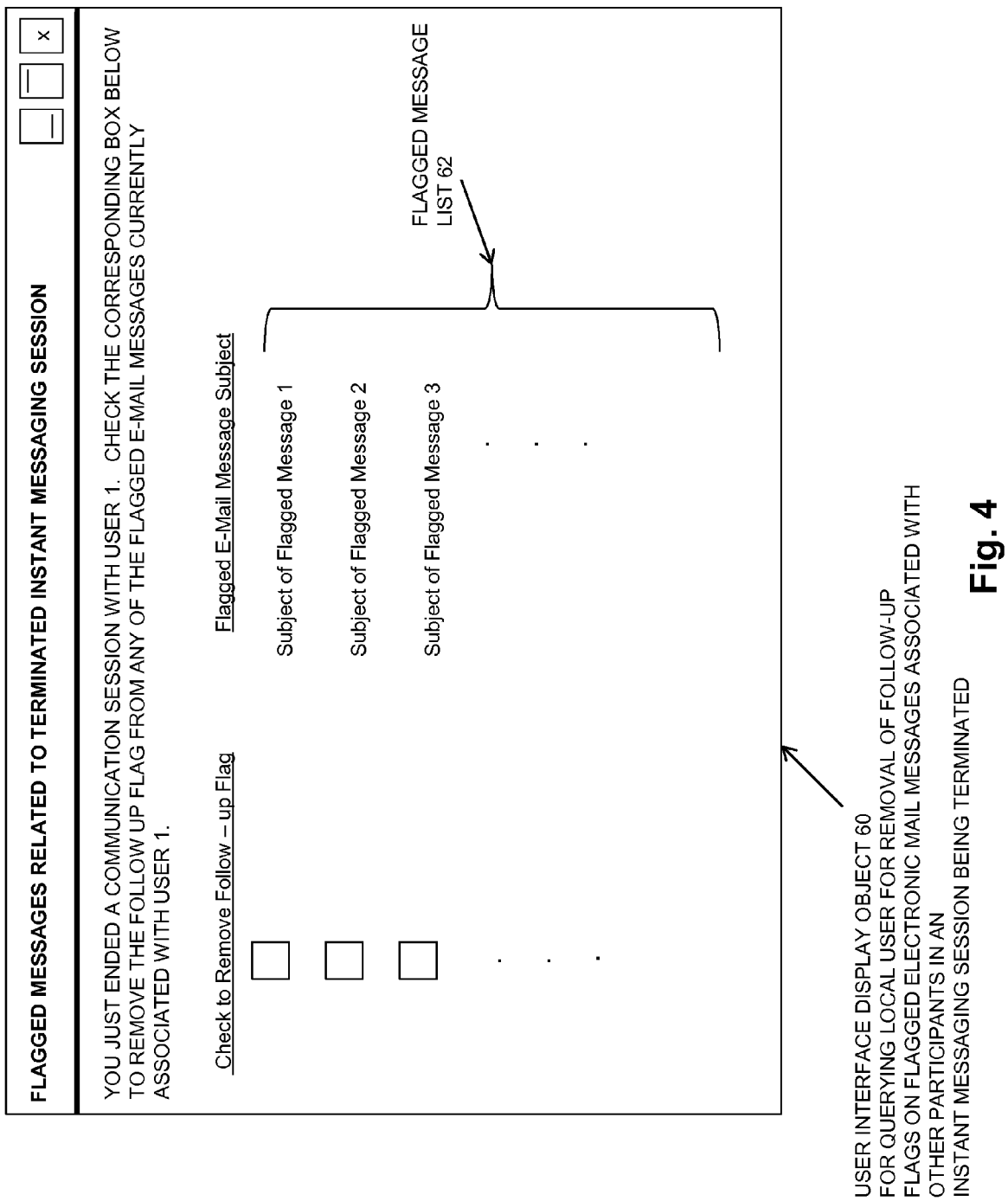
FIG. 4 is a second simplified screen shot showing examples of user interface display objects generated by an illustrative embodiment of the disclosed system.

FIG. 4 is a simplified screen shot showing a User Interface Display Object 60 generated by an illustrative embodiment of the disclosed system to query a local user for removal of follow-up flags on electronic mail messages associated with other participants in an instant messaging session that is currently being terminated. In response to detecting termination of an instant messaging session, an embodiment of the disclosed system generates the User Interface Display Object 60 to allow the local user to remove follow-up flags from any flagged electronic mail messages associated with other participants in the instant messaging session. The List 62 displays all the electronic mail messages having follow-up flags that are associated with the other participants in the instant messaging session. In the example of FIG. 4, the List 62 displays the subject of each such flagged electronic mail message, and the local user can click on a specific message subject to view the complete message. If during the instant messaging session the local user resolved the issue for which follow up was required for a given one of the flagged messages, the local user can check the corresponding check box to cause the follow up flag for that message to be removed.

While in the example of FIG. 4 check boxes are shown for purposes of illustration as a possible technique for indicating that follow-up flags should be removed, the present system is not so limited. Those skilled in the art will therefore realize that any specific alternative user interface mechanism may be used to allow the local user to indicate that a follow-up flag should be removed from a flagged electronic mail message associated with another participant in an instant messaging session that is being terminated.

While the above description makes reference to enabling a user to follow up on flagged electronic mail messages through an instant messaging application, the disclosed system is not so limited. Accordingly, one skilled in the art will recognize that the disclosed system may be embodied to be used with any specific kinds of communication applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
at least one processor and at least one computer readable memory, said computer readable memory having stored thereon program code for, when executed on said at least one processor, providing a multi-application follow-up mechanism by detecting that a user has set a follow-up flag on a message within a first communication application, associating, responsive to said detecting that said user has set said follow-up flag on said message, said flagged message with another user, such that said flagged message is available to a second communication application, wherein said associating said flagged message with said other user includes adding an indication of said message to an entry associated with said other user contained in a list of other users with whom flagged messages are associated, detecting a communication session with said other user provided through said second communication application, displaying, responsive to said detecting said communication session with said other user provided through said second communication application and said entry for said other user contained in said list of other users with whom flagged messages are associated, an indication of said flagged message, wherein said displaying said indication of said flagged messages includes displaying at least a portion of said flagged message, detecting termination of said communication session provided by said second communication application, and displaying, responsive to said detecting of said termination of said communication session provided by said second communication application, a user interface object enabling said user to remove said follow-up flag from said flagged message.

2. The system of claim 1, further comprising:
wherein said first communication application is an electronic mail application; wherein
said second communication application is an instant messaging application; and
wherein said message comprises an electronic mail message contained in an electronic mail mailbox provided for said user by said electronic mail application.

3. The system of claim 1, further comprising:
wherein said displaying said indication of said flagged message includes displaying a list of all flagged messages associated with said other user.

4. The system of claim 1, further comprising:
wherein said associating said flagged message with said other user further includes determining that said other user is a member of a group, and responsive to said determining that said other user is a member of said group, associating said flagged message with each member of said group.

5. The system of claim 1, wherein said first communication application comprises an electronic mail application, and wherein said second communication comprises an instant messaging application, wherein said program code further provides said multi-application follow-up mechanism by:
displaying an indication of the number of flagged electronic mail messages associated with each buddy contained in said user's instant messaging buddy list.

6. A method embodied in at least one computer system for providing a multi-application follow-up mechanism, including steps performed by said computer system comprising:
detecting that a user has set a follow-up flag on a message within a first communication application, associating, responsive to said detecting that said user has set said follow-up flag on said message, said flagged message with another user, such that said flagged message is available to a second communication application, wherein said associating said flagged message with said other user includes adding an indication of said message to an entry associated with said other user contained in a list of other users with whom flagged messages are associated, detecting a communication session with said other user provided through said second communication application, displaying, responsive to said detecting said communication session with said other user provided through said second communication application and said entry for said other user contained in said list of other users with whom flagged messages are associated, an indication of said flagged message, wherein said displaying said indication of said flagged messages includes displaying at least a portion of said flagged message, detecting termination of said communication session provided by said second communication application; and displaying, responsive to said detecting of said termination of said communication session provided by said second communication application, a user interface object enabling said user to remove said follow-up flag from said flagged message.

7. The method of claim 6, further comprising:
wherein said first communication application is an electronic mail application;
wherein said second communication application is an instant messaging application; and
wherein said message comprises an electronic mail message contained in an electronic mail mailbox provided for said user by said electronic mail application.

8. The method of claim 6, further comprising:
wherein said displaying said indication of said flagged message includes displaying a list of all flagged messages associated with said other user.

9. The method of claim 6, further comprising:
wherein said associating said flagged message with said other user further includes determining that said other user is a member of a group, and responsive to said determining that said other user is a member of said group, associating said flagged message with each member of said group.

10. The method of claim 6, wherein said first communication application comprises an electronic mail application, and wherein said second communication comprises an instant messaging application, and further comprising:
displaying an indication of the number of flagged electronic mail messages associated with each buddy contained in said user's instant messaging buddy list.

11. A computer program product comprising:
a non-transitory computer readable storage medium having stored thereon program code for providing a multi-application follow-up mechanism, said program code including
program code for detecting that a user has set a follow-up flag on a message within a first communication application,
program code for associating, responsive to said detecting that said user has set said follow-up flag on said message, said flagged message with another user, such that said flagged message is available to a second communication application, wherein said associating said flagged message with said other user includes adding an indication of said message to an entry associated with said other user contained in a list of other users with whom flagged messages are associated,
detecting a communication session with said other user provided through said second communication application,
displaying, responsive to said detecting said communication session with said other user provided through said second communication application and said entry for said other user contained in said list of other users with whom flagged messages are associated, an indication of said flagged message, wherein said displaying said indication of said flagged messages includes displaying at least a portion of said flagged message,
detecting termination of said communication session provided by said second communication application; and
displaying, responsive to said detecting of said termination of said communication session provided by said second communication application, a user interface object enabling said user to remove said follow-up flag from said flagged message.

* * * * *